Nov. 29, 1932.   H. R. ROGERS   1,889,573
LAWN MOWER
Filed May 19, 1931

Inventor
Harry R. Rogers.
By A. J. O'Brien
Attorney

Patented Nov. 29, 1932

1,889,573

UNITED STATES PATENT OFFICE

HARRY R. ROGERS, OF DENVER, COLORADO

LAWN MOWER

Application filed May 19, 1931. Serial No. 538,464.

This invention relates to improvements in lawn mowers of the type employed by householders for cutting the grass on the lawn.

The ordinary lawn mower is so constructed that the cutter is shorter than the distance between the drive wheels and it is therefore impossible to get close to a wall or to a sidewalk owing to the fact that the outside of the drive wheels extends several inches beyond the ends of the rotary cutter. Owing to the fact that the cutter is shorter than the distance between the wheels, one of the wheels will always travel on the uncut portion of the grass with the result that the grass is pressed down where the wheel passes over it and is therefore not cut to the same length as the other portions when the mower is run over the next swath. Owing to the distance between the outside of the wheels and the end of the cutter, it is obviously impossible to get nearer to the walls or fence than this distance and it is therefore necessary to resort to hand shears or to a specially constructed lawn mower for the purpose of finishing the cutting. In mentioning a specially constructed lawn mower I have in mind a type of mower having a single drive wheel located at one end of the cutter and only a very thin support for the other end, and such a mower is intended for use in cutting grass up to a wall or close to a fence or along a sidewalk. With a lawn mower of the ordinary construction it is necessary to supplement it by the special mower in order to complete the job or else resort to hand shears for finishing the cutting.

The invention which forms the subject of this application comprises a lawn mower in which the rotary cutter is located in front of the drive wheels and in which the length of the cutter is at least equal to the distance between the outside of the two drive wheels. Power is transmitted from the drive wheels to the cutter by means of sprocket chains, although it may also be possible to substitute for the chain drive, a gear drive consisting of several gears forming a gear train.

Having thus briefly described the invention and explained its objects, the invention will now be described in greater detail, and for this purpose reference will be had to the accompanying drawing in which it has been illustrated, and in which.

Figure 1:
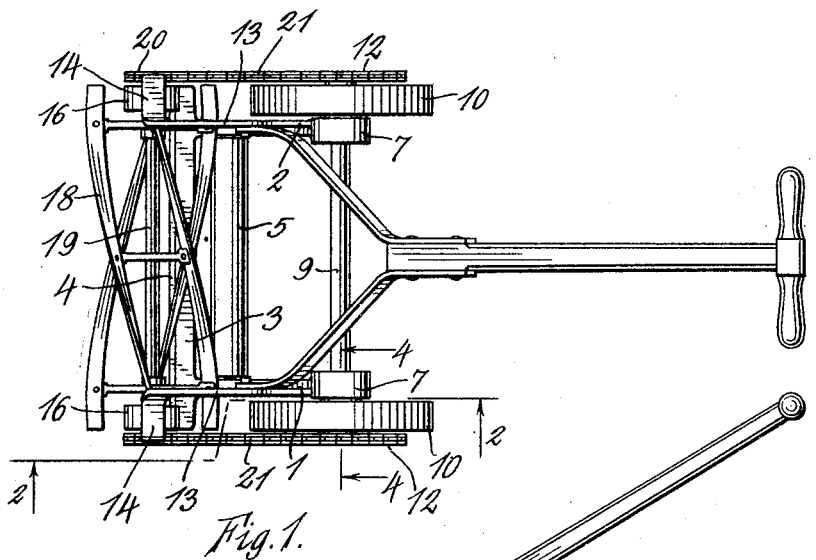
Fig. 1 shows a top plan view of the improved lawn mower.
Figure 2:
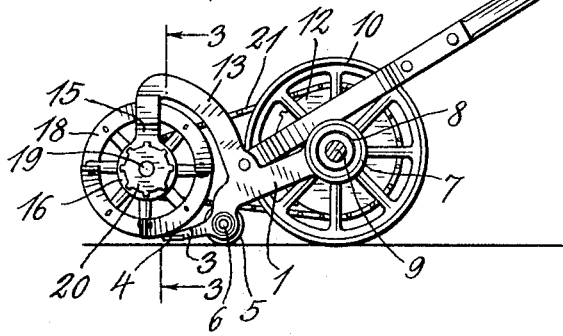
Fig. 2 is a side elevation of the lawn mower; a portion being shown in section taken on line 2—2, Fig. 1.
Figure 4:
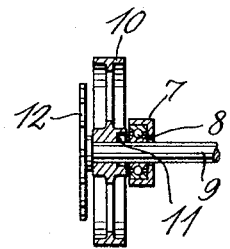
Fig. 4 is a section taken on line 4—4, Fig. 1.
Figure 3:
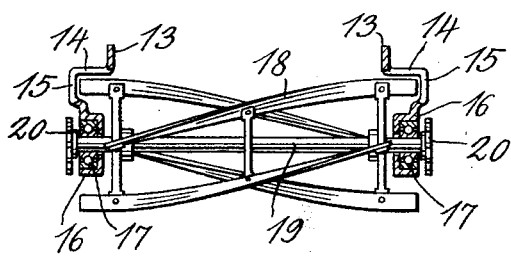
Fig. 3 is a section taken on line 3—3, Fig. 2.

The improved lawn mower that forms the subject of this invention comprises a frame having two side members 1 and 2. The front ends of these members are connected by means of a transverse bar 3 to which the shear plate 4 is attached. A roller 5 is pivotally mounted between the two frame members and rotates about the axis 6. The rear ends of frame members 1 and 2, are provided with housings 7 in which are located ball bearings 8. These bearings are of the ordinary construction and the inner ball race is connected to the drive shaft 9. Secured to the outer ends of the drive shaft are two drive wheels 10. These wheels are provided with the ordinary ratchets 11 which will not be described in detail, because it is old and well known. This ratchet perits the wheels to rotate freely in one direction, but provides a positive drive between the wheels and the shaft when the wheels rotate in the opposite direction. Secured to the outer ends of the shaft are sprocket wheels 12. These sprocket wheels are preferably quite thin and are located as near as possible to the outside of the drive wheels. The frame members 1 and 2 are each provided with an integral bracket 13 that extends upwardly, thence outwardly as indicated at 14 and thence downwardly as indicated at 15. The lower ends of member 15 are provided with cups 16 for the reception of an ordinary ball bearing 17. A rotary cutter having cutter blades 18 is provided with a shaft 19 that extends through the ball bearings 17 and is provided at its outer ends with small sprocket wheels 20. These sprocket wheels are so located that they lie in the same planes as sprockets 12 and are connected with the latter by means of sprocket chains 21. Attention is directed at this point to Fig. 3 from which it will be seen that the lower ends of parts 15 are bent inwardly to such an extent that the outer surfaces of sprocket wheels 20 extend only a short distance beyond the outer surfaces of parts 15 and may even be flush with the latter. It will also be seen that the ends of the blades 18 extend into close proximity to the inner surfaces of members 15 and it is therefore apparent that the mower can be brought so close to a wall that the ends of the blades are spaced from the wall a distance equal to the thickness of member 15, and since this does not have to exceed a quarter of an inch, it is evident that the mower will cut within a half an inch of a wall or a fence, and it is therefore unnecessary to resort to hand shears for the finishing and it is also unnecessary to provide a special lawn mower for the finishing operation.

It will be noted that the handle is pivotally connected to the frame member 1 at a point substantially midway between the drive shaft and the axis of the rotary cutter. The position of the pivotal connection of the handle to the frame is important because it enables the operator to readily tilt the mower about the drive shaft and renders the control easier because it puts the frame member 1 under tension so that the drive shaft will be pulled along instead of pushed as is usual.

A lawn mower constructed in the manner shown in the drawing and described herein can be manufactured at substantially the same cost as the ordinary type of mower but takes the place of two separate machines and therefore saves the price of one of the machines.

In the drawing the preferred construction has been shown, but it is evident that the exact construction shown and described can be departed from without effecting the invention, the gist of which is to so construct the lawn mower that the cutter is located in front of the drive wheels and has a length at least equal to the distance between the outer surfaces of the drive wheels.

Having described the invention what is claimed as new is:

In a lawn mower, in combination, two drive wheels, a shaft connecting the same, two parallel frame members located on the shaft, one adjacent the inner surface of each drive wheel, each frame member having its front end provided with a bracket that is provided with an outwardly extending U-bend near its end, the ends having bearings for supporting a rotary cutter having cutter blades, the ends of the blades projecting into the U-shaped bends and means for transmitting motion from the drive wheels to the cutter.

In testimony whereof I affix my signature.

HARRY R. ROGERS.